(No Model.)

T. F. WOODSIDE.
CRATE FOR FOWLS.

No. 275,969. Patented Apr. 17, 1883.

Witnesses,
Geo. H. Strong
J. H. Rouse

Inventor
Thos. F. Woodside
By
Dewey & Co.
Attorneys

UNITED STATES PATENT OFFICE.

THOMAS F. WOODSIDE, OF MODESTO, CALIFORNIA.

CRATE FOR FOWLS.

SPECIFICATION forming part of Letters Patent No. 275,969, dated April 17, 1883.

Application filed January 2, 1883. (No model.)

*To all whom it may concern:*

Be it known that I, THOMAS F. WOODSIDE, of Modesto, county of Stanislaus, State of California, have invented an Improved Crate for Fowls; and I hereby declare the following to be a full, clear, and exact description thereof.

My invention relates to an improved crate for transporting fowls, small animals, or other articles to market.

It consists of an adjustable partition moving upon guides within the crate, and provided with an adjusting and locking mechanism by which it may be secured at any desired point, and thus divide the cage or crate into compartments of any desired size.

Figure 1:
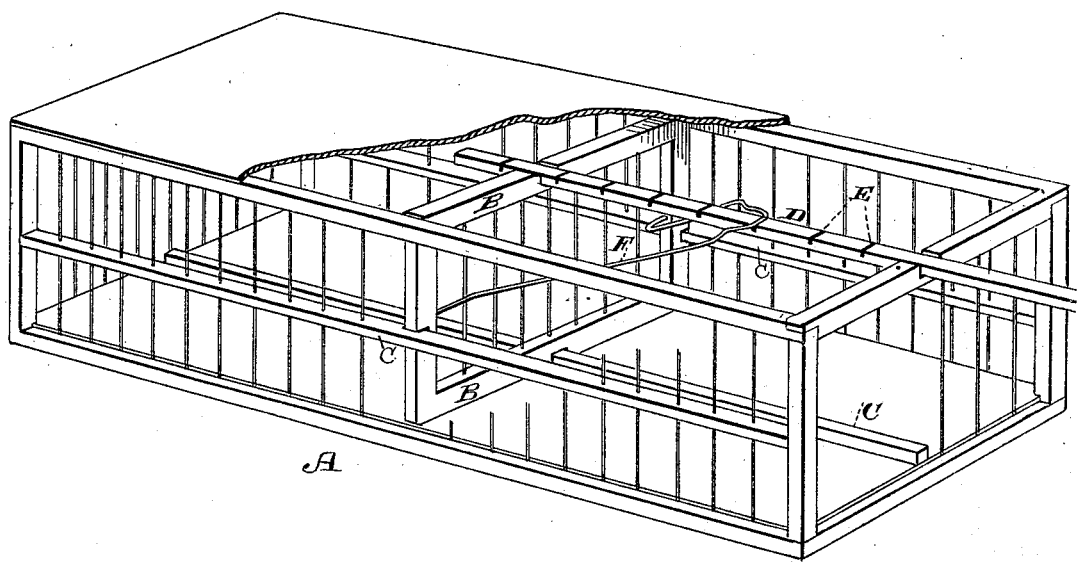
Figure 2:
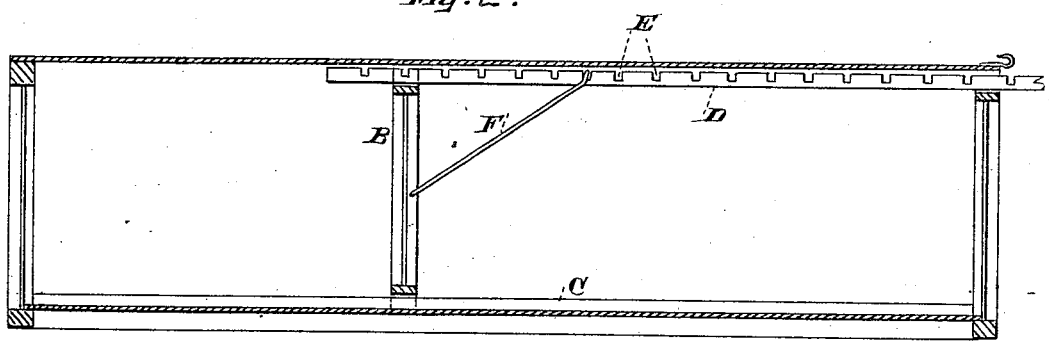
Figure 3:
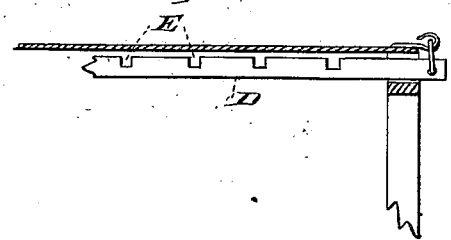

Referring to the accompanying drawings for a more complete explanation of my invention, Figure 1 is a view of my device. Fig. 2 is a longitudinal vertical section. Fig. 3 shows the rod secured.

A is a crate or cage such as is usually employed for the transportation of fowls to market; but it may also be used for other purposes. These crates are made of a size convenient to be handled, and in order to be profitable must be filled to their capacity.

It sometimes happens that not enough of chickens, turkeys, or ducks are ready to fill the crate, but that it might be filled with a part of each. In order to keep the two kinds separate and provide a space for each proportioned to the number there may be, I employ a partition, B, which is fitted to move within the crate upon longitudinal guides C extending from end to end. Various devices may be employed to move this partition and fix it at any desired point. In the present case I have shown a bar, D, extending the full length of the cage or crate close to the top centrally, so as to be out of the way. A notch is cut in the partition, through which the bar passes freely. Notches E are cut at intervals upon one side of the bar to hold the partition at the desired point. A curved bail, F, passes over the top of the bar, and its ends extend backward at an angle to the edges of the partition, where they are attached about midway of its height, so that the bail will draw centrally and not cause the partition to turn or bind upon its guides. When the bar D is turned, so that the notches E are uppermost, the bight of the bail will fall into one of them, and by pulling or pushing the end of the rod which projects outside the crate, the partition may be moved to any desired point, and thus divide the crate into spaces of any required proportion.

By turning the rod so that a smooth side is upward, the rod may be moved without moving the partition, and after the partition is set in the proper place the rod may be pushed back, so that it will not project on the outside of the crate. By turning it again until the notches are uppermost, so that the bail may lie in one of them, and securing the bar in place, it serves as a lock for the partition, preventing it from moving in either direction.

It will be manifest that the partition can be moved and secured in various ways without materially altering the character of my invention. By this means I am enabled to instantly divide a crate, so as to apportion the spaces for the different kinds which are to be placed in each. This partition is also useful when it is necessary to catch the fowls, especially when the crate is nearly empty, as it can be moved along until the fowl or fowls remaining are brought close to the gate, and, being in a confined space, are easily caught.

Having thus described my invention, what I claim as new, and desire to secure by Letters Patent, is—

1. The crate or cage A, with the transverse partition B, movable from end to end of the crate upon guides C, in combination with a mechanism for moving and securing it at any point, substantially as herein described.

2. The crate or cage A, with the transverse partition B, movable upon the longitudinal guides C, in combination with the notched bar D, and the bail F, or an equivalent mechanism, substantially as and for the purpose herein described.

In witness whereof I hereunto set my hand.

THOMAS F. WOODSIDE.

Witnesses:
  GEO. H. STRONG,
  S. H. NOURSE.